(12) United States Patent
Bhogal et al.

(10) Patent No.: US 7,877,765 B2
(45) Date of Patent: Jan. 25, 2011

(54) VIEWING PATTERN DATA COLLECTION

(75) Inventors: Kulvir Singh Bhogal, Fort Worth, TX (US); Gregory Jensen Boss, American Fork, UT (US); Rick Allen Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 11/553,007

(22) Filed: Oct. 26, 2006

(65) Prior Publication Data

US 2008/0101763 A1    May 1, 2008

(51) Int. Cl.
H04N 60/32 (2006.01)
(52) U.S. Cl. .............. 725/21; 386/83; 386/95; 725/9; 725/34; 725/46
(58) Field of Classification Search ........ 725/9, 725/11, 13, 14, 21, 133, 153, 34, 46; 386/83, 386/95
See application file for complete search history.

(56) References Cited

U.S. PATENT DOCUMENTS

| | | | |
|---|---|---|---|
| 6,351,596 B1 | 2/2002 | Ostrover | 386/46 |
| 6,625,503 B1 | 9/2003 | Smith | 700/83 |
| 7,096,486 B1 * | 8/2006 | Ukai et al. | 725/58 |
| 2002/0056087 A1 * | 5/2002 | Berezowski et al. | 725/9 |
| 2002/0188947 A1 * | 12/2002 | Wang et al. | 725/45 |
| 2004/0091236 A1 | 5/2004 | Boston et al. | 386/46 |
| 2005/0050578 A1 | 3/2005 | Ryal | 725/143 |
| 2006/0100987 A1 | 5/2006 | Leurs | 707/3 |
| 2006/0140584 A1 | 6/2006 | Ellis et al. | 386/83 |
| 2007/0245378 A1 * | 10/2007 | Svendsen | 725/46 |

* cited by examiner

Primary Examiner—Ngoc Vu
(74) Attorney, Agent, or Firm—David A. Mims, Jr.; William Steinberg; Robert V. Wilder

(57) ABSTRACT

A method and system are provided in which DVR viewer metrics are collected and saved in a "Watched Log" data base including identifying titles and other features of recorded DVR programs. User viewing metrics are collected and saved for use in determining whether or not future shows are recorded. After a DVR user watches a TV or other video show episode, the show episode will be added to the Watched Log. Subsequently, before recording a new TV show, the DVR device can determine the viewer's actions with regard to previous similar shows and factor such information into a decision regarding the recording of the new show.

14 Claims, 8 Drawing Sheets

| | | | WATCHED LOG 801 | | | | |
|---|---|---|---|---|---|---|---|
| ENTRY 803 | DATE 805 | TYPE 807 | % WATCHED 809 | # TIMES WATCHED 811 | MOST RECENT 813 | USER 815 | TIME TO STOPPAGE 817 |
| 1 | 8/30/06 | DRAMA | 20 | 1 | 8/30/06 | A | 12 Min |
| 2 | 8/30/06 | NATURE | 100 | 2 | 8/30/06 | B | 120 Min |
| 3 | .......... | SPORTS | .......... | 0 | .......... | ..... | .............. |

VIEWING PATTERN DATA COLLECTION

RELATED APPLICATIONS

Subject matter disclosed but not claimed herein is disclosed and claimed in co-pending application Ser. No. 11/553,001, which is included herein by reference.

FIELD OF THE INVENTION

The present invention relates generally to recording systems and more particularly to a system and methodology for making user recording selections based upon user viewing patterns.

BACKGROUND OF THE INVENTION

Currently available digital video recorder (DVR) devices allow a user to record television broadcasts to a hard drive-based digital storage medium. DVR devices have brought the concept of time shifting to television watchers, as users can watch shows they record when their own time permits, rather than being required to watch shows at the time when they are broadcasted. DVR devices are limited to a certain amount of hard drive space, so accordingly, the capacity of DVR devices limits the number of television shows the DVR device can record. Subsequently, DVR users frequently find themselves deleting files (representing episodes) that they have already viewed.

Additionally many DVR devices have the ability to record categories of shows rather than individual shows only. When a user selects such an option, they typically specify a genre of movie sometimes with other subcategories that further refine the show or movie type. Once the user selects the category, they may have the option to define how many shows to keep within that category. This option's purpose is to record shows that the user is likely to enjoy, but that the user may not have been aware of and thus probably would not have recorded individually. The problem, however, is that in using this broad option, the DVR can continually record shows that the user does not want to watch.

Thus, there is a need for an improved system and methodology for enabling a user to generate metrics for, and maintain a record of, watched or partially watched DVR programs and to use such metrics in decisions regarding the selection of the recording of a future shows.

SUMMARY OF THE INVENTION

A method and system are provided in which DVR viewer metrics are collected and saved in a "Watched Log" data base including identifying titles and other features of recorded DVR programs. User viewing metrics are collected and saved for use in determining whether or not future shows are recorded. After a DVR user watches a TV or other video show episode, the show episode will be added to the Watched Log. Subsequently, before recording a new TV show, the DVR device can determine the viewer's actions with regard to previous similar shows and factor such information into a decision regarding the recording of the new show.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
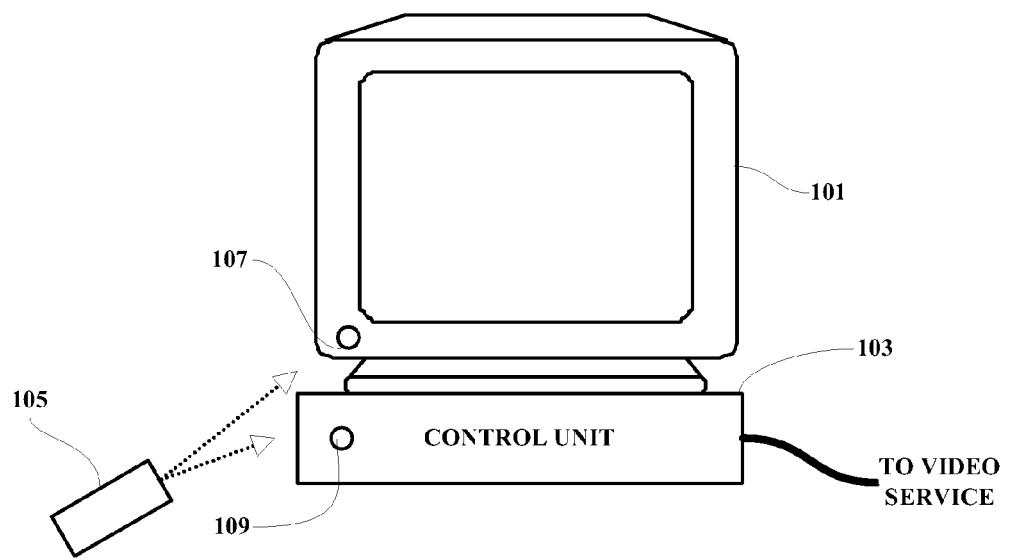
FIG. 1 is an illustration showing a display device and a digital video recorder control unit in which the present invention may be implemented.

It is noted that devices and functions which are shown in block or schematic form in the drawings are generally known to those skilled in the art, and are not specified to any greater extent than that considered necessary as illustrated, for the understanding and appreciation of the underlying concepts of the present invention and in order not to obfuscate or distract from the teachings of the present invention. The term "network" or "network-connected", as used herein, may be a hard-wired or wireless network and may include an in-building network, or a wide area or other more expansive network accessed over the Internet for example.

In accordance with one exemplary embodiment of the invention, after a DVR user watches a TV show episode, the TV show episode will be added to a watched log. Subsequently, before recording a future TV show, the DVR device verifies that the scheduled TV show episode is not already in the "Watched Log." If the show is in the Watched Log, various rules are used to determine which recording actions to take.

The Watched Log stores viewing information as a percentage of the show watched, allowing for more granular tuning and conflict resolution management. The Watched Log also stores the number of times a show has been recorded and viewing information for each of those recordings. Finally, the Watched Log stores the dates and times a show has previously been recorded. In one embodiment, all of the above information is segmented by user identity, to enable the use of the Watched Log by a plurality of viewers in households or other networks with many viewers.

A rules engine augments the existing well known techniques in DVR recording conflict management. The goal of known recording conflict management techniques is to anticipate to the highest degree of accuracy available, the decisions a user would take if that user was engaged in each decision of which show to record when there is an "either-or" decision because of limited recording space. Recording conflict management is necessary because of the limited number of tuners or input channels that can be used to record simultaneous shows. The rules engine will enable more accurate conflict resolution decisions by applying information derived from the Watched Log. The Rules engine uses information about how often a show has been watched, how recently it has been watched, and what percentage of the show has been seen. The combination of these data points will enable more effective conflict management in the recording of DVR programs.

The disclosed methodology operates by keeping a log of shows watched via the DVR device inside a relational store (e.g., a data base). When a user completes the watching of a TV show, the user can optionally be presented with an choice to add an entry to a table known as the Watched Log. Typically the creation of such a table entry is accomplished automatically, unless the user chooses to override the default setting. At the time a show is recorded on the DVR, the first entry is logged which consists of a unique identifier for the show. The date and time of the recording and other distinguishing characteristics are also recorded including, but not limited to: (1) User or Users (if applicable); (2) Date/Time of recording; (3) Date/Time viewing began; (4) Date/Time viewing was completed; and (5) Percentage of show viewed. At the time the user begins watching a recorded show, the Watched Log will be updated to reflect the start time. If the user watches the show in its entirety, that too will be reflected in the log. This is indicated with both a percentage complete (100%) and optionally, a "Time-to-complete" which would be equal to (offset by a small threshold which can be user defined) the length of the show. If the playback of the show is paused or indefinitely postponed, then the percentage complete entry is updated accordingly. Although focus of the exemplary embodiment includes only a single user, it is noted that the Watched Log methodology applies also to groups of viewers and is also user-specific so that one user's watched data is separate every other user.

The following factors, inter alia, are derived from the Watched Log data to augment existing recording conflict management techniques. The list is not intended to be comprehensive and other useful data could be derived from the available DVR data and entered into the Watched Log. The factors implemented in the exemplary embodiment include: (1) Delay from Record Time to Watch Time; (2) Percentage of show watched, i.e. played or watched time as a percentage of time required for a complete showing; (3) Number of times the show has been watched previously; (4) Most recent viewing of show; and (5) Time to complete viewing. The above data are all easily derived from the elements recorded in the Watched Log. Once derived, they can be used to determine which of two or more conflicting potential recordings should take precedence. A rules engine is used to implement this. The rules engine requires the preferences of the end user to be entered in manually one time. Once preferences have been established—e.g., which of the recording criteria are most important to the user ranked in priority order, what threshold constitutes recent viewings, etc., then existing conflict management techniques can be augmented in accordance with the Watched Log described herein. For example, it is well known in various DVR solutions that a user can place the recording of one show in priority over any other show, essentially a prioritized list; however, there are no methods available to sort conflicts out for shows that have not been prioritized.

As herein disclosed, in future instances when the DVR device will record a show marked for recording (either directly or indirectly through zones), the DVR device will first check to see if an entry exists in the already Watched Log table. As used herein, "recording zones" refers to the selection of only times, days and/or channels for recording rather than specific shows. If an entry exists corresponding to the show about to be recorded, the DVR will first determine if there is unreserved capacity on the drive and if there are any conflicting recordings. If either or both of these conditions exist, then the DVR can use the Watched Log to determine or help determine if the show should be recorded. This recognition of shows about to be recorded can be performed as soon as a discovery is made that an entry exists in the Watched Log that was marked for recording from the electronic program guide or other input to the DVR.

Watched Log Information can be imported or exported for backup purposes or for synchronization with other Watch Logs on other DVRs belonging to a user. In one example, the DVR will associate an already watched show log with multiple users. When deciding to record, the DVR device will confirm that all users registered with the DVR have stated that a given show has been watched. In another example, after watching a show, the viewers of the show are asked to confirm which of the users registered with the DVR were present for the viewing of the show. Upon completion of a show's viewing, the DVR optionally asks whether the show should be broadly marked as viewed, or just viewed by a subset of the viewers in the household. In another implementation, radio frequency identification (RFID) technology may be used whereby RFID tags are worn by viewers and their presence in the vicinity of a DVR is detected while a show is being watched. The watched log is automatically updated when a viewer leaves the detectable vicinity of the DVR device or when a show is completed.

The present invention provides a method to record users actions/reactions to already-recorded content so that user's preferences can be automatically derived and applied to future decisions as to what content to record. This is accomplished by maintaining a data base of each show that is recorded and the corresponding user reactions to that recorded content. Additionally, an interface is provided to the end user that allows for certain customization and configuration of the interpretations of each action. Once a show is recorded and a log entry is made, the system will monitor the user actions taken on that particular recording. If a user deletes a show without watching it, there is an implication that the user is not interested in that show based upon the information available (summary, title, rating, etc.). If a user watches ten minutes of a show and then deletes it, there is a similar implication that the user is not interested in that show for the same reasons as before, but this is furthermore now based upon real exposure to that show. The user may also watch the whole show from beginning to end, an indication that the user may want to watch similar shows in the future. The user may watch the whole show, but rewind and replay several parts of it. As before, this is an even stronger indication that the user may want to watch similar shows in the future. A user may also watch the same show multiple times. Finally, the user may take additional actions after the show is watched, a fact which can also be recorded. Some such actions might be to save the show after it has been watched (as opposed to deleting it) or searching for other shows with the same director or actors, or within the same genre.

Once the system has recorded the actions taken by the user, it can then apply that knowledge to future recording decisions so that recorded content more accurately represents the content that would be most agreeable to the user. For example, the user has asked for four hours of Science Fiction shows to be recorded, and deleted only when space is needed for another newer show. In this example, assume the DVR has recorded two episodes of a first series, one episode of a second series, and one episode of a third series. The user watched both episodes of the first series and did not delete either one of them after having watched them. He watched 20% of the second series, paused it, then watched another 30% the following day, but never completed viewing the show although the user didn't delete it. Finally, the user summarily deleted the third series show without watching it. In this situation, the DVR would determine that the user dislikes the third series, may be somewhat interested in the second series (because he continued viewing it but neither completed nor deleted), and that the user probably is very interested in the first series. With this knowledge, the DVR can begin recording more episodes of the first series and perhaps other related content (reruns, movies or shows with similar actors or directors, etcetera) and record fewer shows of the second series, until it is clear which direction the user is going with the second series. Finally, the DVR can stop recording for a period of time any third series shows based upon the user's prior viewing actions. This type of applied knowledge becomes more valuable as more data is collected in the data base because patterns can then be established. It would become obvious over time, for example, if a user always deleted movies that were rated R for language but not rated R for violence or if a user always watched shows with a first actor but deleted shows 90% of the time with a second actor. This data base and learning system could also be augmented to include show data that the user specifically recorded.

As shown in FIG. 1, an exemplary system includes a display device 101 which is connected to a digital video recorder (DVR) control unit 103. A remote control unit 105 enables a user to input commands and/or menu selections through sensing receptors 107 and 109 on the display 101 and the control unit 103, respectively. The control unit 103 is arranged for connection to a video service which provides programs for viewing on the display unit 101.

Figure 2:
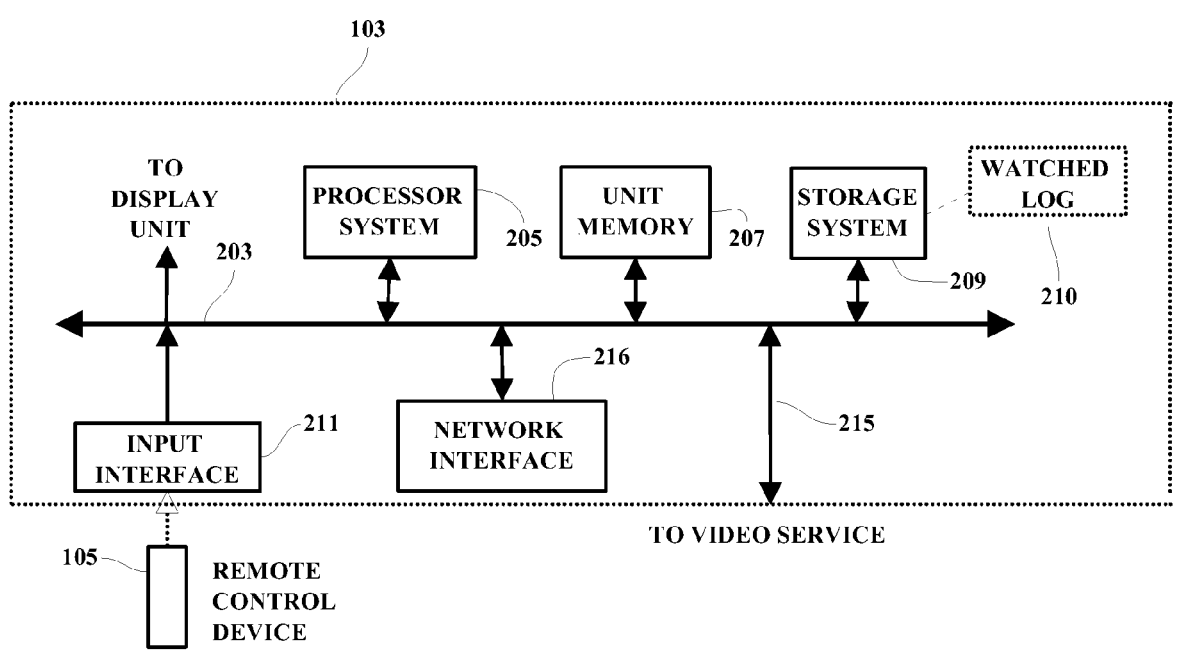
FIG. 2 is a schematic block diagram showing several of the major components of a digital video recorder control unit in an exemplary implementation of the present invention.

As shown in FIG. 2, the control unit 103 includes, inter alia, a main bus 203 connected to the display unit 101. Also connected to the main bus 203 are a processor system 205, a unit memory 207, a storage system 209 which includes the Watched Log data base 210, the input interface 211 which is arranged for receiving signals from the user remote control device 105, and a network interface 216 which is arranged for selective connection to an interconnection network. A connection 215 is also provided for the video service input.

Figures 3, 4:
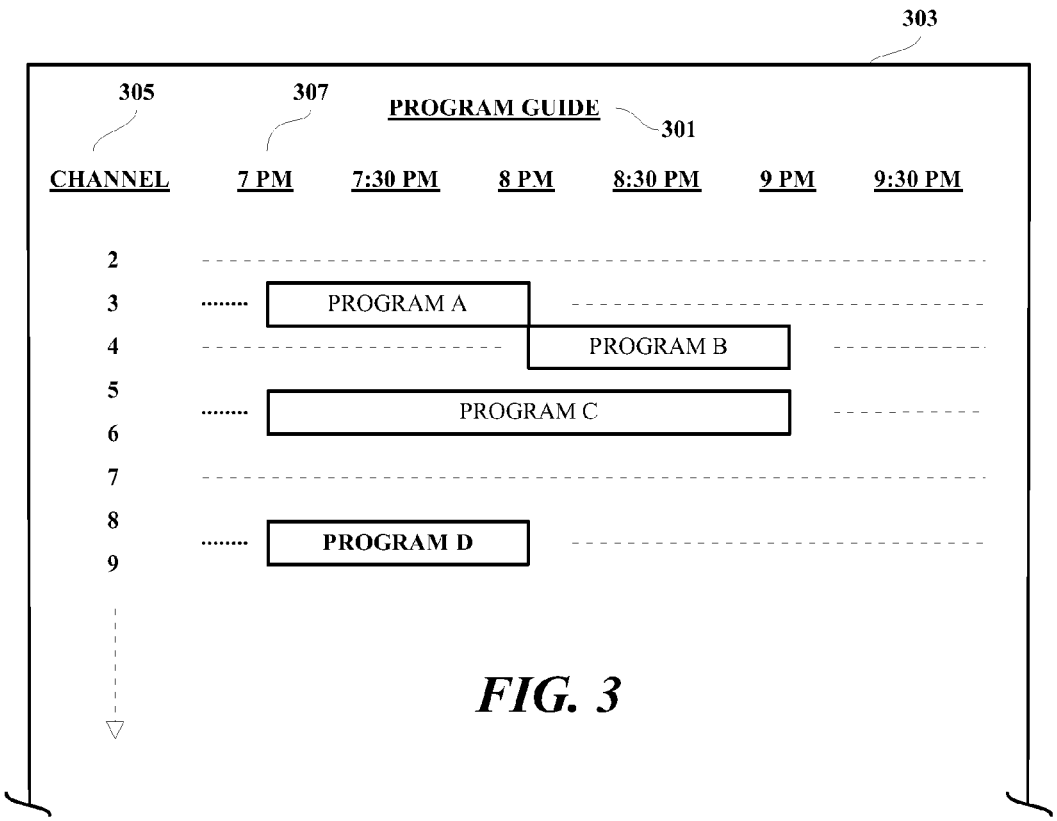
FIG. 3 is an illustration of an exemplary Program Guide useful in explaining an operation of the present invention.
FIG. 4 is an illustration of an exemplary Recording Log useful in explaining an operation of the present invention.

FIG. 3 illustrates an exemplary Program Guide 301 which is selectively displayed to a user on a display screen 303 of a monitor or display device 101. The Program Guide 301 includes, in a first column 305, the various channels which may be selected by the user. Also shown are various time slots 307 during which various programs are scheduled to be presented. The user is enabled to control the selection of certain ones of the programs through the use of the remote control device 105. In an exemplary operation, it is presumed that Programs A, B and C have already been scheduled to be recorded, and the user wishes to schedule an additional program, i.e. Program D from the user's control unit. The user will highlight Program D on the Program Guide and push a "Record" button (not shown) on the remote control unit 105.

FIG. 4 illustrates an example of a Recording Log 401 which includes data base entries corresponding to programs which have been recorded by one or more users on a common DVR system. The Recording Log 401 identifies an entry number 403, a program or series name 405, a program title 407, a type 409 or classification for the designated program, a date 411 on which the program was recorded, a start time 413 and an end time 415 for the recorded program, a channel identity 417 for the channel the program was recorded from and an information entry 419 which indicates that additional information is available concerning a highlighted program. A user is enabled to highlight the program of interest and actuate an "Information" button on the remote control unit 105 to generate an overlying information window on the user display. For example, the information entry window (not shown) will include a description of the corresponding program as well as other information such as actors if the program is a drama or movie and date that the movie was created. For sports programs, the information field will include, for example, the type of sports i.e. baseball, football, tennis, etc., and also the names of the teams and the date that the sports event took place. Also, inter alia, the information window will contain the names of key players etc. All of the information in the Recording Log 401, including the information in the information window, is program-accessible and also searchable by a user, and may be accessed by various user programs for one or more users to search for specific user-preferred items.

Figure 5:
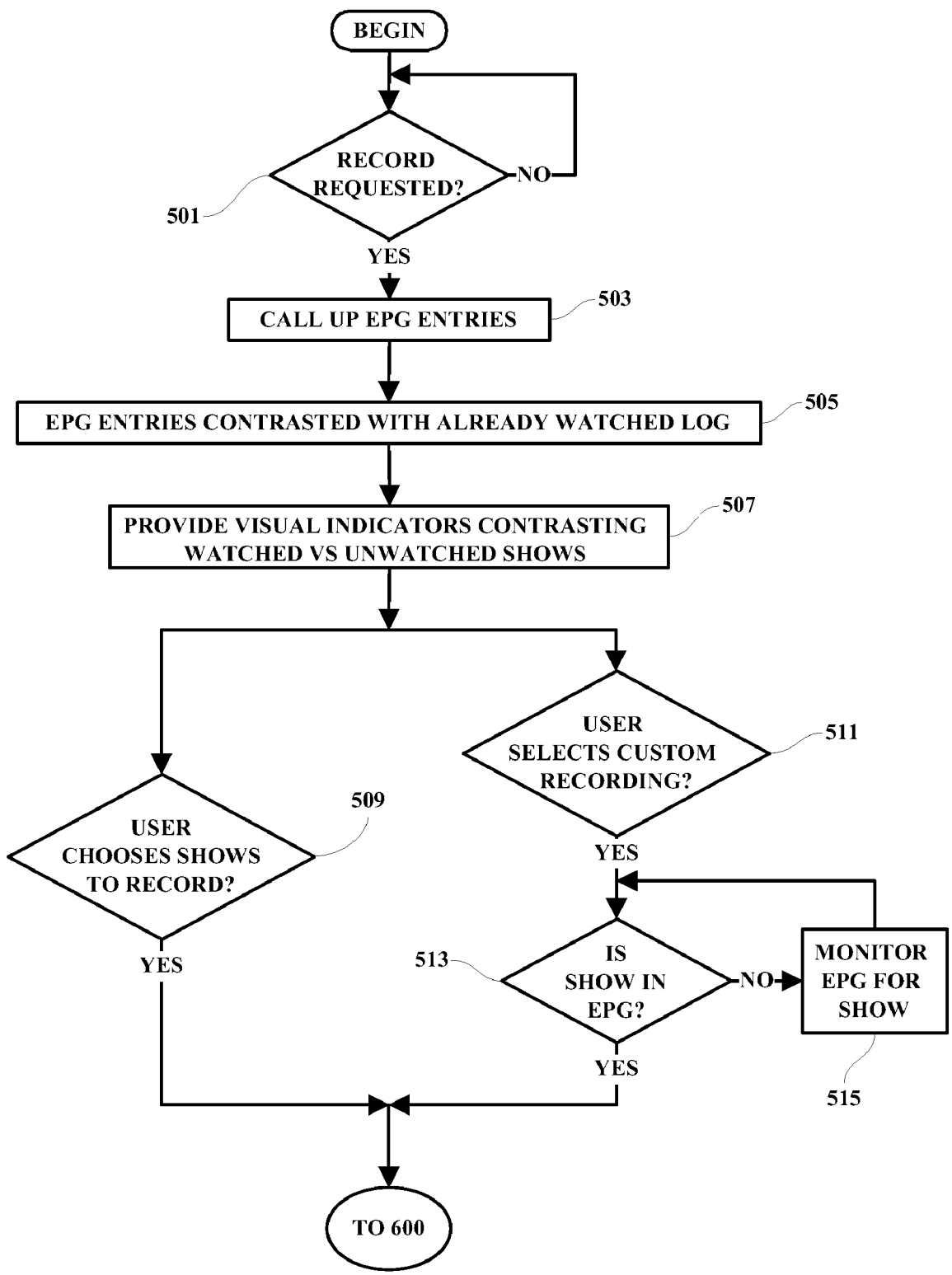
FIG. 5 is an illustration of a flow chart showing an exemplary operational sequence including the methodology of the present invention.
Figure 6:
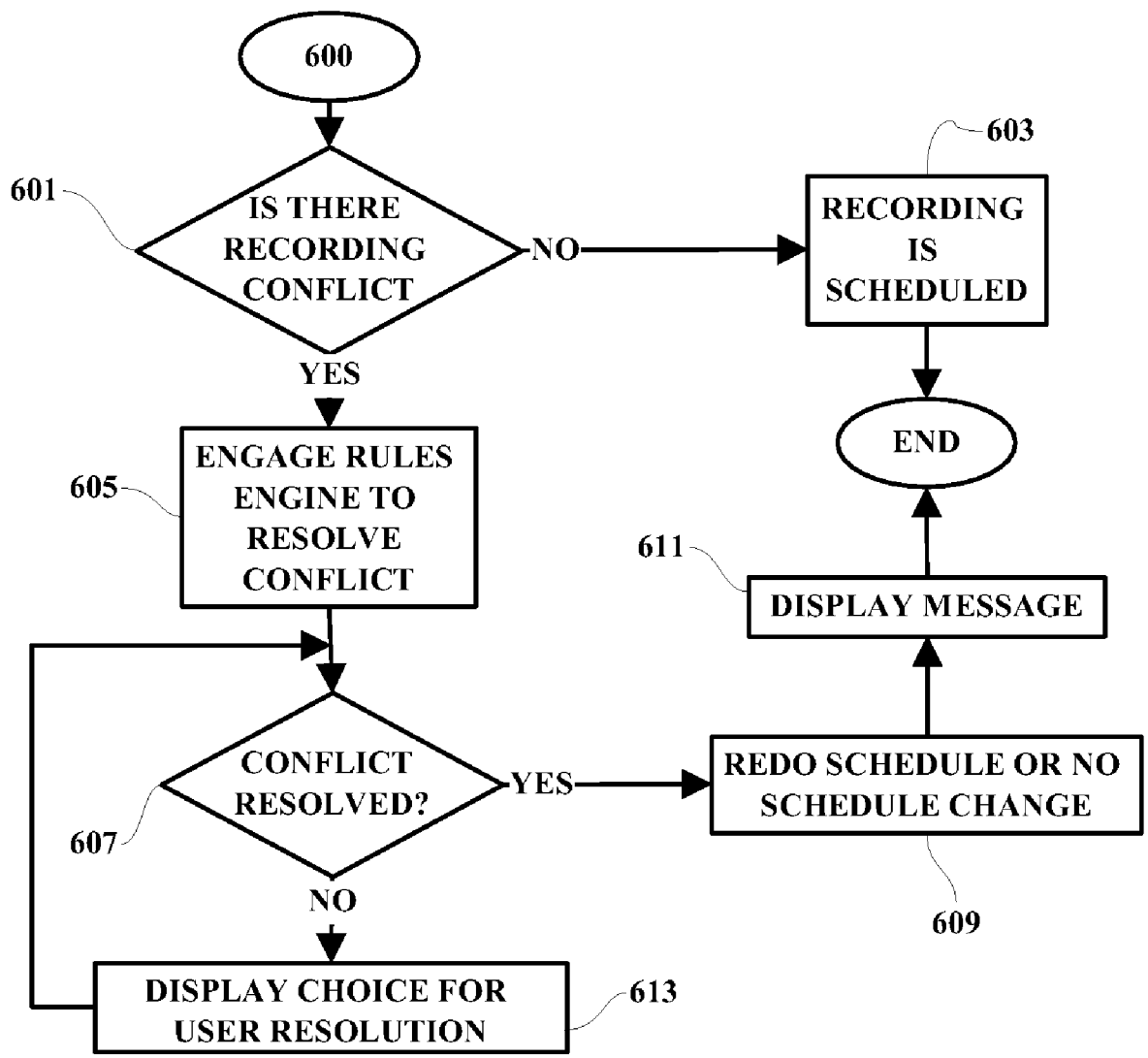
FIG. 6 is a flow chart illustrating an exemplary operational sequence when a DVR recording conflict is detected.

As shown in FIG. 5, when a user requests a recording 501, the EPG entry log 301 is called up 503 and, in accordance with the present invention, the EPG entries are contrasted with a Watched Log (FIG. 8) 505 and visual indicators are generated 507 on the user's display to indicate which shows have already been watched. For example, shows on the EPG may be displayed in a different color or a separate column may be added to indicate that a particular show has already been recorded or watched by the user. If the user then selects a custom recording feature 511, a determination is made if the show which the user wishes to record 511 is in the EPG 513. If not, the processing will periodically monitor 515 future changes in the EPG to determine when the selected show is scheduled to be shown. The custom recording feature enables a user to input to an input screen (not shown) various characteristics of a show which the user wishes to have recorded. For example, the user may be prompted to input any of the data contained in the Recording Log 401 (such as program name, title, actors, etc.) and the program will monitor the EPG for a future match. When the input show appears in the EPG 513, or if the user selects to record a show already present on the EPG 509, then the processing continues as shown in FIG. 6.

After a show is selected for recording 600, it is determined whether or not there is a recording conflict 601. If there is no recording conflict 601, the recording is scheduled 603 and the process ends. If it is determined that a recording conflict exists 601, then a Rules Engine is engaged 605 to resolve the conflict. A conflict would exist, for example, if the user selected to record a show for a time slot for which the user's allowed number of shows had already been scheduled to be recorded. The conflict Rules Engine would then access a user preference file and, depending upon the outcome of the conflict resolution 607, the process would continue by either canceling the recording of a show already scheduled to be recorded to make storage space available for the newly selected show, or make no changes to the recording log 609. A message is then displayed 611 to the user advising the user of what action has been taken, i.e. either which show has been cancelled or that no re-scheduling has occurred. Optionally, when there is a conflict which cannot be resolved 607, the conflict information is presented to the user 613 for resolution by user input.

Figure 7:
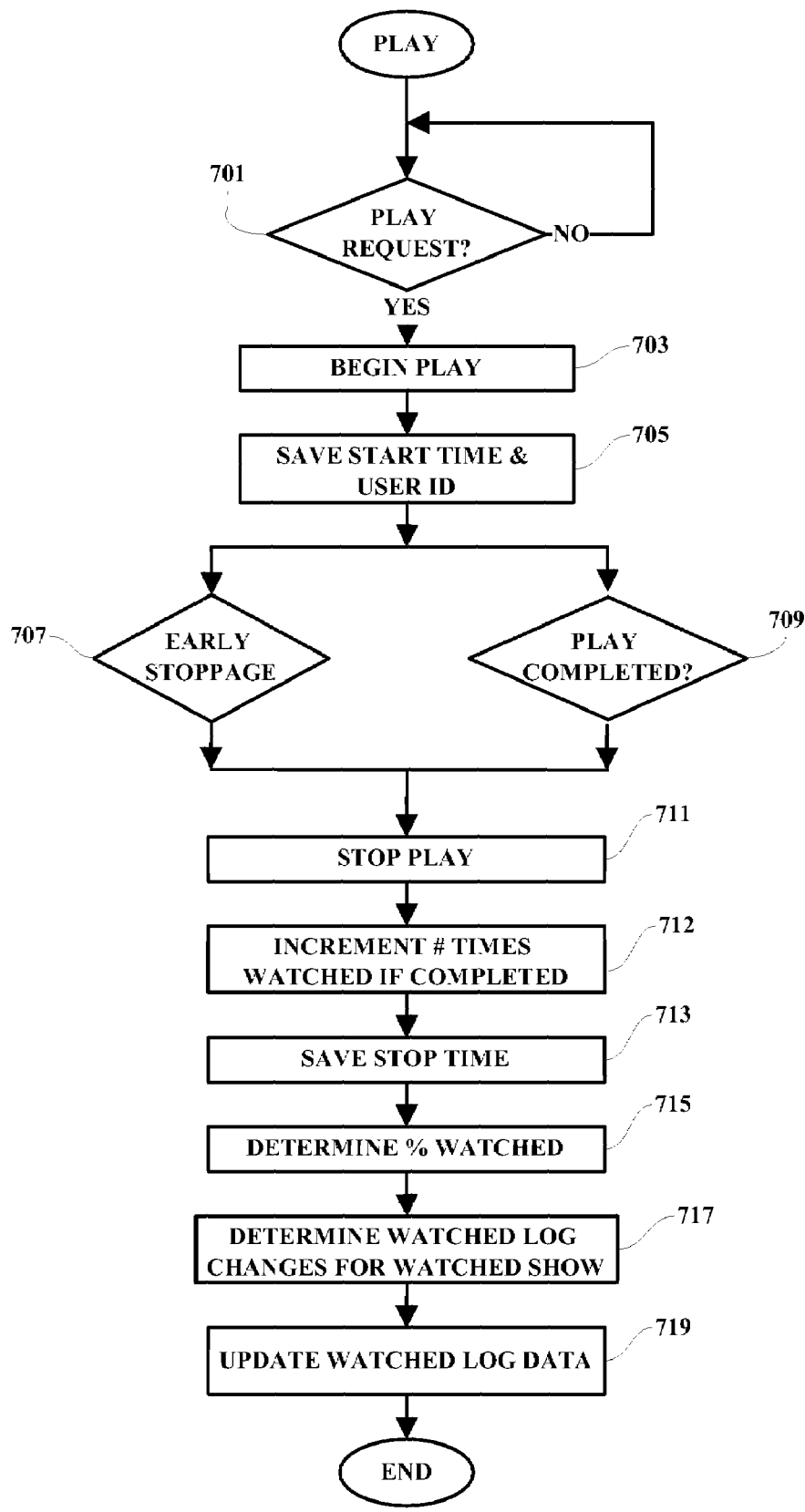
FIG. 7 is an exemplary flow chart illustrating an updating operation to the Watched Log of the present invention.
Figures 8, 9:
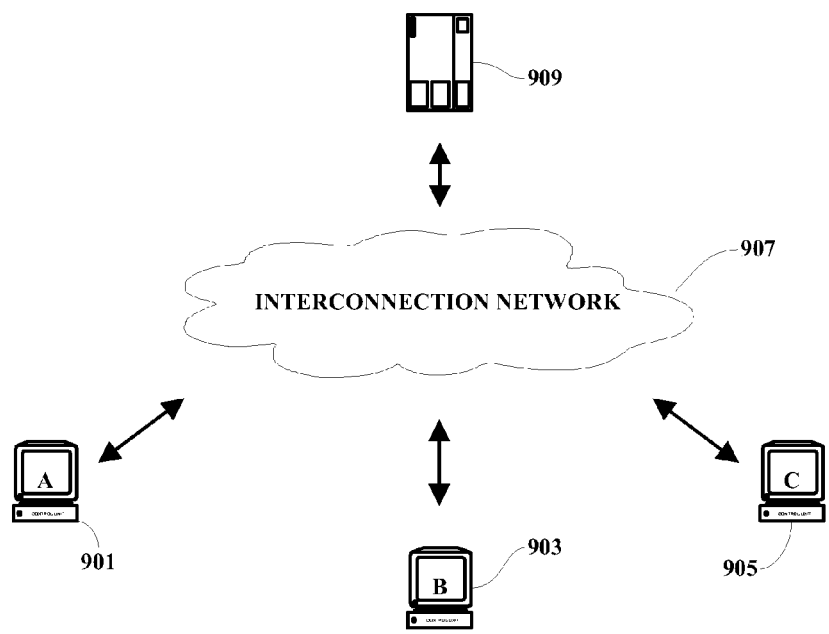
FIG. 8 is an illustration of an exemplary Watched Log data base.
FIG. 9 is an illustration showing a network connection of a plurality of viewers using a common Watched Log for recorded programs.

In FIG. 7, a exemplary flow chart is presented to illustrate a typical operation of the methodology disclosed herein. As shown, when a user makes a play request 701 to play a recorded show, the selected show begins to play 703 on the user's display 101. The start time of the playing of the selected show is recorded together with the ID of the user requesting the play 705. The user ID is input by the user at the time the request to play is made. This may be accomplished by a selection from a menu of users authorized to operate the particular DVR device. Thereafter, if the show plays to completion 707 or if there is an early stoppage of the playing 709 by the user, the playing of the selected show is stopped 711. If the show had been completed 709, the system increments the "# of times watched" field 712 in a "Watched Log" data base (FIG. 8). The stop time is also saved 713 and the percentage of show watched before stoppage is determined 715. Other data relating to the selected "watched show" are also determined 717 and all of the changes resulting from the user's most recent viewing of the selected recorded show are gathered and input to update the Watched Log data base 719. In this manner, new statistical data regarding the Recording Log and the user's viewing habits, are created. These data include, but are not limited to: (1) Which of the recorded shows have been watched; (2) How much of the played recorded show has been watched; (3) Which users watched which shows; (4) Which shows were only partially watched; (5) What percentage of a plurality of authorized viewers watched which shows in their entirety; etc. Once the users' viewing actions are known with respect to particular shows, this information can be used in many ways to improve the efficiency of the recording and viewing processes for one or many authorized DVD users.

FIG. 8 illustrates several of the data points which are tracked in an exemplary "Watched Log". As shown, each line entry has an entry number 803 for correlation purposes to other data files such as the Recording Log 301. The program names and titles of the shows may also be included. The date that a show is partially or wholly watched is also recorded 805. The type of show 807 and the percent watched 809 information is also tracked along with the number of times watched 811, the most recent playing 813, the particular user 815 who watched the show and the time from start to stop of the particular line item show. For example, show #1 was watched on Aug. 30, 2006 by user "A", but only 20% or 12 minutes of the show was watched before stoppage. Further, user "B" watched show #2 until completion twice on Aug. 30, 2006.

The Watched Log system disclosed herein may be implemented for only one user or for many users or DVR stations. As shown in FIG. 8, DVR stations or users A, B and C are connected through an interconnection network 907, such as the Internet, to a video source or video server 909. The Watched Log data base may be created and stored in each of the individual storage devices within the stations A, B, and C, or in the video server storage, to track the viewing habits or viewing events of each authorized user having access to the individual DVR devices.

In accordance with the present invention, a data base of shows watched via the DVR device is created and maintained inside a relational store (e.g., a data base). When a show is recorded an entry is logged automatically with distinguishing characteristics which may include for example, without limitation: (1) MPAA Rating (including reasons for the rating or subcategories if available); (2) Genre (including sub-genre types); (3) Series Membership (if applicable, includes things that belong to a series); (4) Actors; (5) Keywords; and/or (5) Channel.

When a user completes the viewing of a TV show an entry is logged automatically with distinguishing viewer action characteristics including, but not limited to: (1) Date/Time viewing began; (2) Date/Time viewing ended; (3) Length of the show; (4) How much content was skipped (60 second skip or fast-forward); (5) How much content was rewound (10 second replay or rewind); (6) How much of the recording was taken up with advertising; (7) Was the show completely viewed; (8) Was the show deleted; (9) Was the show left in the DVR queue after viewing; (10) Were shows with similar criteria (actors, directors, subject matter) searched for and added to the recording queue after the viewing; (11) Which shows in the DVR queue were watched first; (12) Was the recorded show directly targeted; (13) Was the recorded show marked not to be deleted until the user deletes the show.

Targeted shows are those shows that the user specifically identifies for recording. The fact that the user asks for the show indicates that there is at least a perceived interest in some aspect or characteristic of that show. This can be added to the data base and weighed in with the rest of the characteristics for future recording decisions. Indirectly targeted categories include those shows that the user did not specifically ask to be recorded, but which are being added to the DVR Queue due to an implied interest either directly indicated by the end user, or derived from the user's actions to other previously recorded content. A user interface ("UI", not shown) allows the user to see all the elements that affect recording decisions listed above and allow the user to activate or deactivate each one along with the ability to distinguish one action as more or less valuable than another action. This could be as simple as prioritizing in a sorted list the actions that should have the most weight at the top of the list and as complex as allowing the user to give each action a weighted value which will influence the final combined value of the collective actions of for that show (or db entry). In this manner the user could indicate that deleting a show prior to show completion is the single most important factor in making future decisions. In this vein, it should be noted that to improve the decision-making process, an optional question may be asked of the user why the show was deleted. Such high-granularity question, could be the form of a multiple choice list, e.g., "Do not like the show, never record again," or "Like the show, but have already seen that episode," and so forth.

Figure 10:
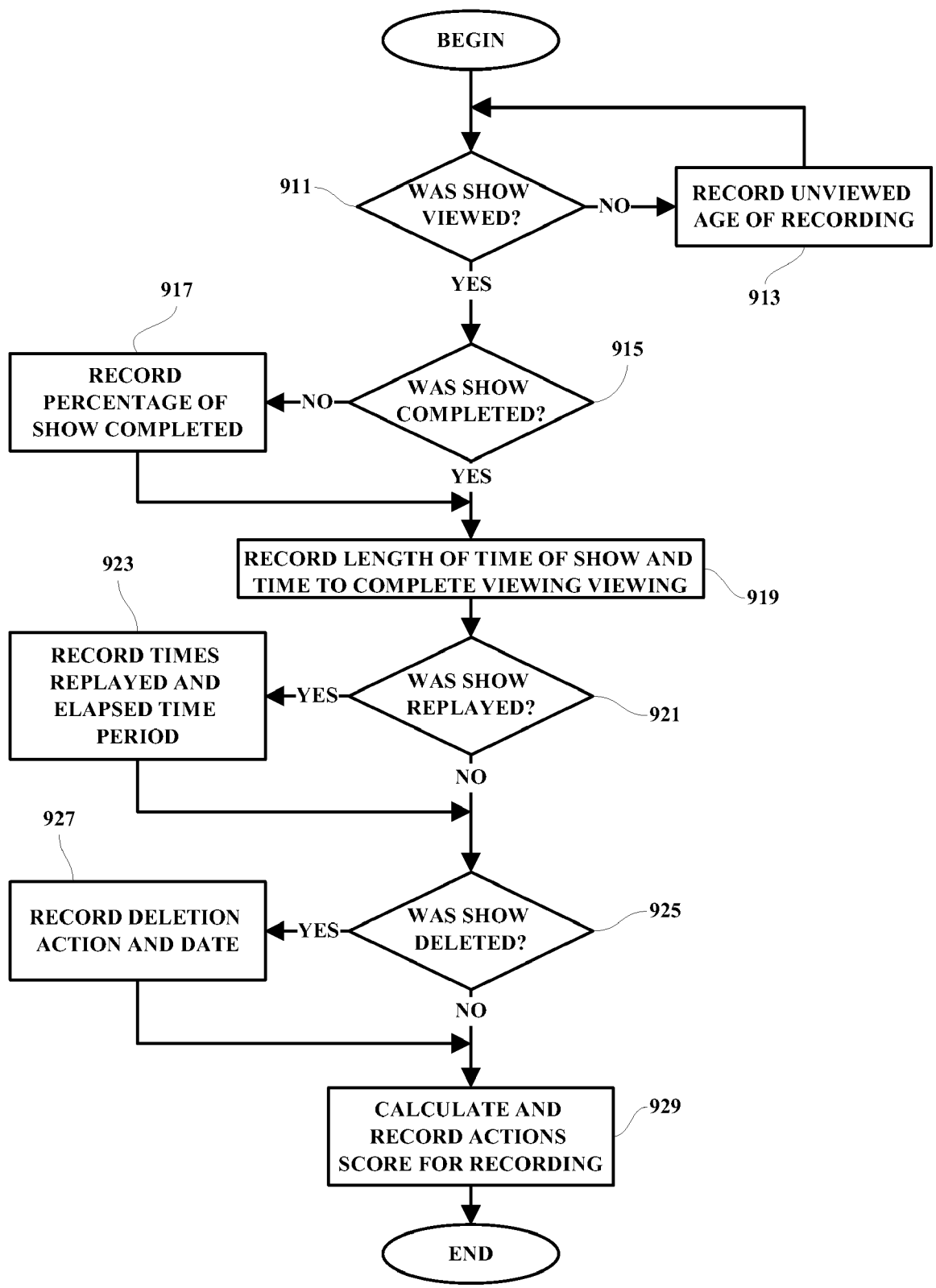
FIG. 10 is a more detailed flow chart illustrating the recording of several exemplary viewer actions in assembling a viewer actions data score for use in making a recording decision with regard to a show being considered for recording.

FIG. 10 illustrates one example of the collecting and saving of several of the viewer action characteristics, and the determining of an "actions score" with regard to the viewing actions of the user. The processing begins by determining if a show has been viewed 911. If a designated show has been recorded but not yet viewed, then the unviewed age of the recording may be recorded 913 as an indication of a lack of interest by the viewer. If a recorded show has been viewed 911, it is then determined if the show was viewed completely 915. If not viewed completely 915, then the percentage of the show that was viewed is recorded 917 in an actions data base. If the designated show had been completely or even partially viewed, then the length of time of the show and the time taken to view the show is recorded 919. Next it is determined whether or not the show was replayed 921 and if so, the number of times it was replayed, and optionally, the overall elapsed time period, are recorded 923. Next, it is determined and recorded if the show had been deleted 925 and if so, the date of deletion 927. Finally, a viewer actions score is calculated and recorded 929 for the designated recording.

The actions score is then used as a factor in determining what future shows will be recorded. The process for calculating the actions score uses the collected and saved viewer watching actions in determining a number, for example, which is then used as a measure of the viewer preferences for recording shows. Weighted preference logic statements may be implemented in software or hardware to determine a show's action score based upon an application of the saved viewer actions as a measure of the user's viewing preferences. For example, a detected deletion of a first show before a complete viewing may provide a score of "0" whereas a second show which has been replayed three times may provide an actions score of "9". Thus, in comparing the actions scores for the first show and the second show, it can be determined that the viewer prefers the second show characteristics over those of the first show characteristics. Thus the actions score developed for each recorded show provides the basis for future recording decisions regarding similar shows.

Figure 11:
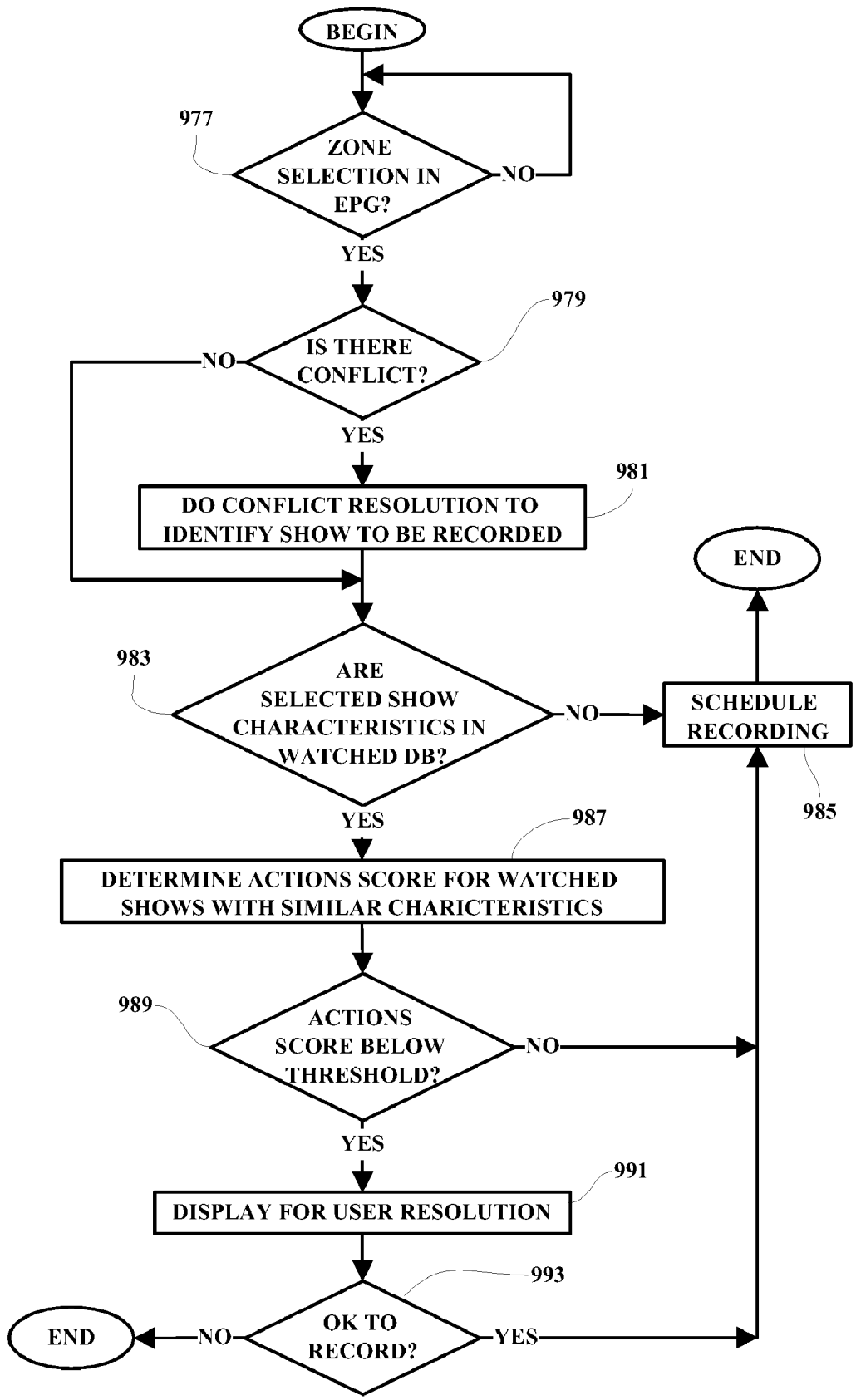
FIG. 11 is a flow chart illustrating an exemplary application of the viewer action feedback in a selection of a show to be considered for recording.

FIG. 11 illustrates an exemplary application of the actions score which is developed as shown in FIG. 10. As shown in the FIG. 11 example, when it is determined that a user-scheduled zone selection is present in an EPG 977, it is then further determined whether or not there is a conflict 979. If there is a scheduling conflict 979, then a conflict resolution process is executed 981 to resolve the conflict and determine which of two or more candidates for recording should be selected. Next, it is determined whether or not the selected show characteristics (e.g. "sports", "baseball", etc.) of the show being considered for recording are in the watched data base 983. If not, then the show is recorded 985 without further process. If, however, the selected show being considered for recording includes characteristics that are present 983 for similar shows in the watched data base, then those characteristics can be used to calculate an actions score for the show being considered for recording in order to avoid recording a show that, in accordance with the user's own previous viewing actions, is not preferred. The actions score for shows similar to the selected show is determined 987 and if the calculated actions score is below a designated threshold level 989, then the selected show may not be recorded, or, alternatively, a message may be presented 991 to a user for a final decision regarding the recording of the selected show. In one example, the user may manually override 993 a below-threshold actions score in order to schedule the recording 985 of the selected show notwithstanding the below-threshold actions score.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing video program recordings in a computerized video processing system, said method comprising:
    determining viewing actions of a user in viewing recorded video programs, said viewer actions being indicative of preferred recorded video programs of said user;
    determining preferred descriptive characteristics of said preferred recorded video programs;
    recording a most recent time of viewing for said preferred recorded video programs; and
    resolving recording conflicts between two or more subsequently requested recordings by determining which of said requested recordings includes more of said preferred descriptive characteristics as such descriptive characteristics are determined by recorded video programs more recently viewed by said user.

2. The method as set forth in claim 1 and further including:
    saving said preferred descriptive characteristics of said preferred recorded video programs and said viewer actions related to said recorded video programs in a viewer actions data file.

3. The method as set forth in claim 2 and further including:
    detecting a request to record a designated video program;
    determining at least one descriptive characteristic of said designated video program; and
    accessing said viewer actions data file to determine viewer actions of said user for video programs having said one descriptive characteristic.

4. The method as set forth in claim 3 and further including using said viewer actions of said user in determining whether or not to record said designated video program.

5. The method as set forth in claim 4 and further including assigning an actions score number for each of said recorded video programs, said actions score number being indicative of said viewing actions of said user for each recorded video program.

6. The method as set forth in claim 5 and further including:
    preventing a recording of said designated video program if said actions score number for recorded video programs having said one descriptive characteristic of said designated video program has a predetermined relationship relative to a designated threshold actions score number.

7. A computer non-transitory readable storage medium having computer readable program code embodied therewith, said computer readable program code being configured for:
    determining viewing actions of a user in viewing recorded video programs, said viewer actions being indicative of preferred recorded video programs of said user;
    determining preferred descriptive characteristics of said preferred recorded video programs;
    recording a most recent time of viewing for said preferred recorded video programs; and
    resolving recording conflicts between two or more subsequently requested recordings by determining which of said requested recordings includes more of said preferred descriptive characteristics as such descriptive characteristics are determined by recorded video programs more recently viewed by said user.

8. The medium as set forth in claim 7 wherein said computer readable program code is further configured for:
    saving said preferred descriptive characteristics of said preferred recorded video programs and said viewer actions related to said recorded video programs in a viewer actions data file.

9. The medium as set forth in claim 8 wherein said computer readable program code is further configured for:
    detecting a request to record a designated video program;
    determining at least one descriptive characteristic of said designated video program; and
    accessing said viewer actions data file to determine viewer actions of said user for video programs having said one descriptive characteristic.

10. The medium as set forth in claim 9 wherein said computer readable program code is further configured for using said viewer actions of said user in determining whether or not to record said designated video program.

11. The medium as set forth in claim 10 wherein said computer readable program code is further configured for assigning an actions score number for each of said recorded video programs, said actions score number being indicative of said viewing actions of said user for each recorded video program.

12. The medium as set forth in claim 11 wherein said computer readable program code is further configured for:

preventing a recording of said designated video program if said actions score number for recorded video programs having said one descriptive characteristic of said designated video program has a predetermined relationship relative to a designated threshold actions score number.

13. A system for processing video program recordings, said system comprising:

a system bus;

a CPU device connected to said system bus;

a display device connected to said system bus for displaying said video program recordings;

means for determining viewing actions of a user in viewing recorded video programs, said viewer actions being indicative of preferred recorded video programs of said user;

means for determining preferred descriptive characteristics of said preferred recorded video programs;

means for recording a most recent time of viewing for said preferred recorded video programs; and means for resolving recording conflicts between two or more subsequently requested recordings by determining which of said requested recordings includes more of said preferred descriptive characteristics as such descriptive characteristics are determined by recorded video programs more recently viewed by said user.

14. The system as set forth in claim 13 and further including:

means for saving said preferred descriptive characteristics of said preferred recorded video programs and said viewer actions related to said recorded video programs in a viewer actions data file.

* * * * *